(12) United States Patent
Lee et al.

(10) Patent No.: US 9,986,082 B2
(45) Date of Patent: May 29, 2018

(54) INTERFACE DEVICE AND METHOD BETWEEN ELECTRONIC DEVICE AND EXTERNAL DEVICE USING EAR JACK OF THE ELECTRONIC DEVICE

(71) Applicant: Samsung Electronics Co., Ltd., Gyeonggi-do (KR)

(72) Inventors: Changsu Lee, Gyeonggi-do (KR); Sungsoo Moon, Gyeonggi-do (KR); Kemsuk Seo, Gyeonggi-do (KR); Bongjae Rhee, Gyeonggi-do (KR); Sangmoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 15/011,227

(22) Filed: Jan. 29, 2016

(65) Prior Publication Data
US 2016/0227018 A1    Aug. 4, 2016

(30) Foreign Application Priority Data
Jan. 30, 2015    (KR) .......................... 10-2015-0015463

(51) Int. Cl.
*H04R 1/10*    (2006.01)
*H04M 1/725*    (2006.01)
(Continued)

(52) U.S. Cl.
CPC ..... *H04M 1/72527* (2013.01); *H04M 1/0274* (2013.01); *H04R 1/1041* (2013.01); *H04R 29/001* (2013.01); *H04R 2440/07* (2013.01)

(58) Field of Classification Search
CPC ............... H04R 1/1041; H04R 1/1025; H04M 1/72527; H04M 1/0274; H04M 1/725
(Continued)

(56) References Cited

U.S. PATENT DOCUMENTS 8,801,472 B1    8/2014 Yen et al.
2009/0109639 A1*    4/2009 Li ..................... H04M 1/72527
                                                         361/748
(Continued)

FOREIGN PATENT DOCUMENTS

KR    10-1119528 B1    2/2012
KR    10-1332181 B1    11/2013
KR    10-1372522 B1    3/2014

*Primary Examiner* — Vivian Chin
*Assistant Examiner* — Ubachukwu Odunukwe

(57) ABSTRACT

An interface device and method between an electronic device and an external device using an ear jack of a smart device are disclosed in order to implement an interface that is capable of automatically recognizing an ear jack insertion type appcessory. The interface device includes: an electronic device including an ear jack including a plurality of audio signal input and output terminals; an external device including an interface unit including a connector unit configured to be inserted into the ear jack, the connector unit including a plurality of terminals that correspond to the plurality of audio signal input and output terminals provided in the ear jack of the electronic device, respectively; and a recognizing unit on the connector unit of the interface unit configured to recognize whether the external device is connected to the ear jack of the electronic device through a plurality of detections.

18 Claims, 10 Drawing Sheets

(51) Int. Cl.
*H04M 1/02* (2006.01)
*H04R 29/00* (2006.01)

(58) Field of Classification Search
USPC .............................. 381/74, 58; 455/557, 572
See application file for complete search history.

(56) References Cited

U.S. PATENT DOCUMENTS

| | | | |
|---|---|---|---|
| 2013/0108064 A1* | 5/2013 | Kocalar | G01B 31/31857 381/58 |
| 2013/0315406 A1* | 11/2013 | Choi | H04R 29/001 381/58 |
| 2015/0071480 A1* | 3/2015 | Jones | H02J 7/0044 381/384 |

* cited by examiner

INTERFACE DEVICE AND METHOD BETWEEN ELECTRONIC DEVICE AND EXTERNAL DEVICE USING EAR JACK OF THE ELECTRONIC DEVICE

CROSS-REFERENCE TO RELATED APPLICATIONS AND CLAIM OF PRIORITY

The present application is related to and claims benefit under 35 U.S.C. § 119(a) of Korean patent application filed on Jan. 30, 2015 in the Korean Intellectual Property Office and assigned Serial number 10-2015-0015463, the entire disclosure of which is hereby incorporated by reference.

TECHNICAL FIELD

Various embodiments of the present disclosure relate to an interface device and method, using an ear jack of the electronic device, between an electronic device and an external device.

BACKGROUND

With the advancement of electronic devices, various methods have been developed for transmitting digital data provided to an electronic device to another electronic device, or to the internet, rather than only storing the digital data in an individual device.

For example, an electronic device, such as a smart phone, is provided with wired and wireless communication functions with a high grade user interface, a peripheral, or an external device, and includes, as a representative communication means, a USB for wired communication, and a wireless modem, WiFi, BLUETOOTH, RFID (Radio Frequency Identification), NFC (Near Field Communication), or the like, for wireless communication.

Such a smart device refers to a portable terminal whose functions may be considerably changed or expanded through an application program (typically, referred to as an "application" or an "app" for short) rather than being limited. For example, a smart phone, a smart TV, a smart key, a smart card, a tablet computer, or a smart pad may be exemplified as the smart device.

As described above, the smart device is configured such that various functions may be changed or expanded through the installation and execution of various applications. Further, by performing data transmission/reception with various peripherals or external devices and processing received data, the functions of the smart device may be more variously and conveniently expanded.

As the peripherals or external devices, the smart device includes not only sound devices, such as a speaker, an earphone, a headphone for enjoying music or movie, a mic for recording sounds, and an ear set for hands-free calling, but also input devices for user input interfaces, such as a joystick, a mouse, and a keyboard, an imaging device for photographing, such as a camera, and a display device for reproducing images. Without being limited thereto, any devices are applicable to the smart device as long as they are connected to the smart phone to be capable of variously expanding the functions of the smart device. For example, the smart device further includes sensor devices that are capable of transmitting measurement information for an external environment or measurement information for a subject to be examined, such as a blood glucose meter and a blood pressure meter.

The peripherals or external devices are provided with basic means (e.g., a USB port) that enable data communication with a typical electronic device, such as a computer. However, it is not practical for the peripherals or external devices to include all the means that enable data communication with any other electronic device, including a smart device, without restriction. That is, the external devices should be manufactured in a small portable size due to the characteristics thereof. Further, there are various other restrictions. For example, in order to reduce the user's burden of expense, it is necessary to lower the manufacturing costs of the external devices. Therefore, it is not practical for the external devices to include all the various wired/wireless interfaces in order to enable data communication with any other electronic devices.

Accordingly, manufactures have no choice but to select and employ any one of the most typical communication means, such as a USB port, and users will have to deal with an inconvenience in that they should transmit/receive data depending on the employed data communication means.

Thus, the smart device, such as a smart phone, is provided with a standardized ear mic port for normally inputting/outputting audio signals, such as music or sounds. Accordingly, the smart phone may conduct a function of outputting or inputting sounds when an earphone or a mic is connected to the ear mic port. The smart device, which includes the ear mic port, is provided with a separate Codec. When there is provided a means that is capable of using the ear mic port for data communication between the smart device and an external device by performing a function of converting the digital data stored in the smart device into analog signals in order to output the digital data as the sounds or, on the contrary, performing a function of converting analog sounds input from the outside into digital signals for data storage, the external devices may easily perform data communication with smart devices even if the external devices are not provided with various kinds of data communication interfaces.

Hitherto, however, when an external accessary device (hereinafter, referred to as an "appcessory") is connected to a smart phone through the ear jack, it is recognized as if an earphone is inserted so that the audio path is changed to the earphone. In this state, there are no great problems in using the smart phone. However, when a phone call is received, an audio path of the receiver (RCV) is changed to an ear audio path so that sounds are not output from the receiver (RCV) and thus the user cannot hear received sounds.

In addition, in the case where the corresponding appcessory is, for example, an appcessory named "Cocoberry CAT" or an appcessory named "iLucir Body Fat Analyzer," when an external device having such an appcessory is inserted into the ear jack of the smart device, it is recognized on the application in a software manner. Thus, it is necessary to forcibly turn the audio path to the receiver (RCV) after separately receiving the user's confirmation for matters the corresponding appcessory. Further, the concept of the corresponding appcessory is that when the external device of the corresponding appcessory is removed, the appcessory returns again to its original state. Therefore, there is an inconvenience in that the user should manually operate the corresponding application.

SUMMARY

To address the above-discussed deficiencies, it is a primary object to provide an interface device and method between an electronic device and an external device using an ear jack of a smart device in order to implement an interface that is capable of automatically recognizing an ear jack insertion type appcessory.

Another object of the present disclosure is to provide an interface device and method between an electronic device and an external device using an ear jack of a smart device that can improve its convenience of use by automatically executing a corresponding application in a terminal.

In accordance with an interface device comprises: an electronic device including an ear jack comprising a plurality of audio signal input and output terminals; an external device including an interface unit comprising a connector unit configured to be inserted into the ear jack, the connector unit comprising a plurality of terminals that correspond to the plurality of audio signal input and output terminals in the ear jack of the electronic device, respectively; and a recognizing unit on the connector unit of the interface unit to recognize whether the external device is connected to the ear jack of the electronic device through a plurality of detections, wherein data communication is performed between the electronic device and the external device, and, among the plurality of terminals of the connector unit, any one terminal is formed with an insulative coating or is made of a non-conductive material such that the terminal is not electrically connected even if the terminal is inserted into the ear jack.

In accordance with an interface method comprises: inserting an earphone or a connector unit of an external device through an ear jack of an electronic device; confirming whether a first detection exists; confirming whether a second detection exists subsequent to the confirming of the first detection; recognizing that the earphone is connected when the second detection is confirmed; confirming whether the second detection exists in a state where the first detection is not confirmed; recognizing that the connector unit of the external device is connected when the second detection is confirmed; recognizing an ID of an appcessory of the external device; and automatically executing an associated application.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
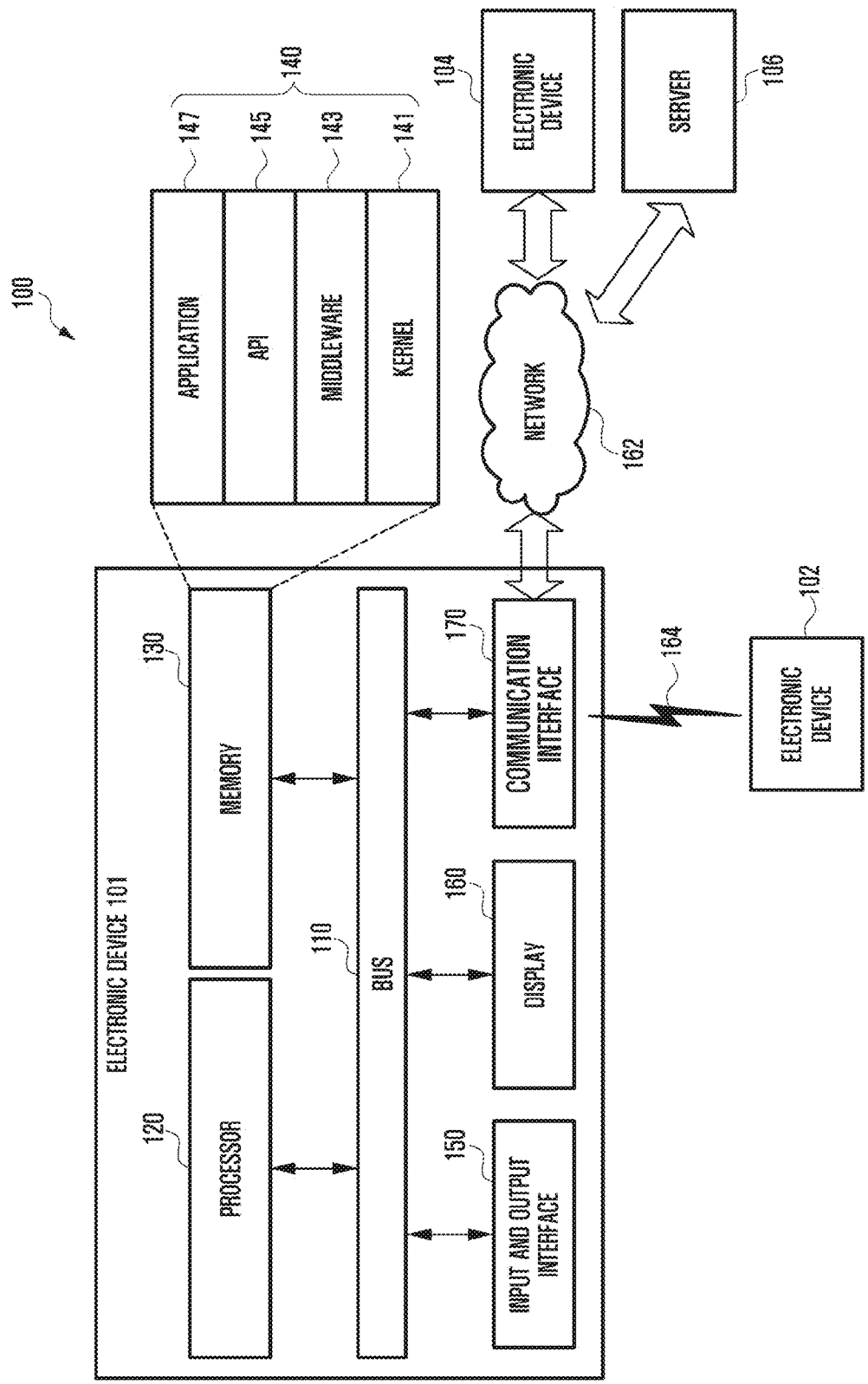
FIG. 1 illustrates a network environment including an electronic device according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

The expression "configured to" uses in the present disclosure may be replaced, according to situations, with "suitable for," "having the capacity to", "designed to", "adapted to", "made to", or "capable of". The term "configured to" may not always mean "specially designed to". In some situations, "device configured to" may mean that the device can "do something" with other devices or components. For example, a context "processor configured to execute A, B, and C" may mean a dedicated processor (for example, embedded processor) for executing a corresponding operation, or a generic-purpose processor (for example, CPU or application processor) capable of executing corresponding operations by using at least one software program stored in a memory device.

The terms used in the present disclosure is to merely describe a specific embodiment, and is not intended to limit the scope of other embodiments. A singular form may include a plural form. All the terms including a technical or scientific term may have the same meaning as terms generally understood by those skilled in the prior art. The terms defined in a general dictionary may be interpreted as having the same or similar meaning in a context of related technology, and are not interpreted abnormally or excessively unless clearly defined in the present disclosure. According to situations, the terms defined in the present disclosure cannot be interpreted as excluding the embodiments of the present disclosure.

An electronic device according to various embodiments of the present disclosure is a device including a projection function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HVID) such as electronic glasses, electronic clothes, and electronic bracelet, an electronic necklace, an electronic appcessary, an electronic tattoo, and a smart watch.

According to some embodiments, the electronic device may be a smart home appliance having a projection function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, SAMSUNG HOME-SYNC™, APPLE TV™, or GOOGLE TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device includes at least one of furniture or a part of a building/structure, an electronic board, an electronic signature receiving device, a projector, and various types of measuring devices (for example, a water meter, an electricity meter, a gas meter, a radio wave meter and the like) including a projection function. The electronic device according to various embodiments of the present disclosure is one or a combination of the above described various devices. Further, the electronic device according to various embodiments of the present disclosure is a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments refers to a person who uses an electronic device or a device (for example, an artificial intelligence electronic device) which uses an electronic device.

Referring to FIG. 1, an electronic device 100 in a network environment 162 is disclosed according to various embodiments of the present disclosure. The electronic device includes a bus 110, processor 120, memory 130, input/output interface 150, display 160, and communication interface 170. In certain embodiments of the present disclosure, the electronic device 100 may omit at least one of the above components or additionally include other components.

The bus 110 is a circuit connecting the above described components and transmitting communication (for example, a control message) between the above described components.

The processor 120 receives commands from other components (for example, the memory 130, the input/output interface 140, the display 150, the communication interface 160, or the projecting management module 170) through the bus 110, analyzes the received commands, and executes calculation or data processing according to the analyzed commands.

The processor 120 receives commands from other components (for example, the memory 130, the input/output interface 150, the display 160, the communication interface 160, or the projecting management module 170) through the bus 110, analyzes the received commands, and executes calculation or data processing according to the analyzed commands.

The processor 120 is configured to receive at least two touch inputs in a lock state of the display 160 and release the lock state if the inputs are identical to a pre-stored pattern. The processor can receive a first touch input through the display 160 in a lock sate of the display 160 and receive a second touch input after receiving the first touch input. The processor identifies whether the second touch input is in a selected area based on at least one imaginary axis crossing the location of the first touch input, and decides that the touch inputs are identical to the stored pattern based on the result of identifying.

According to various embodiments of the present disclosure, the processor 120 is configured to decide that the touch inputs are in a selected area by identifying whether an angle between the imaginary axis and an imaginary line connecting the first touch input and the second touch input is in a selected area. The processor 120 is configured to receive a third touch input after receiving the second touch input, to identify whether the third touch input is in a selected area based on another imaginary axis crossing the location of the second touch input, and to decide that the touch inputs are identical to the stored pattern based on the result of identifying.

The memory 130 includes a volatile and/or non-volatile memory. For example, the memory can store command or data related to at least one component of the electronic device 100. According to certain embodiments of the present disclosure, the memory 130 can store software and/or program 140. For example, the program 140 includes a kernel 141, middleware 143, application programing interface (API) 145, and/or application program (or "application") 147. At least one of the kernel 141, middleware 143, and API 145 is called operating system (OS).

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 101 can be used, to the application 147.

The API 145 is an interface by which the application 147 can control a function provided by the kernel 141 or the middleware 143 and includes, for example, at least one interface or function (for example, command) for a file control, a window control, image processing, or a character control.

For example, the input/output interface 150 takes a role of transmitting a command or data input by a user or other external devices to other components of the electronic device 101. Further, the input/output interface 150 can output a command or data received from other components of the electronic device 100 to a user or other external devices.

For example, the display 160 includes a liquid crystal display (LCD), light emitting diode (LED) display, organic light emitting diode (OLED) display, micro-electro-mechanical systems (MEMS) display, or electronic paper display. The display 160 can display various contents such as a text, image, Video, icon, and symbol. The display 160 includes a touch screen, and can receive a touch, gesture, proximity, or hovering input by using an electronic pen or a part of a user's body.

The communication interface 170 connects communication between the electronic device 102 and the external device (for example, electronic device 104 or server 106). For example, the communication interface 170 accesses a network 162 through wireless or wired communication to communicate with the external device.

The wireless communication includes at least one of, local area network 164 (for example, WiFi, BLUETOOTH (BT), Near Field Communication (NFC), a Global Positioning System (GPS)) and cellular communication (for example, LTE, LTE-A, CDMA, WCDMA, UMTS, WiBro or GSM). The wired communication includes at least one of, for example, a Universal Serial Bus (USB), a High Definition Multimedia Interface (HDMI), Recommended Standard 232 (RS-232), and a Plain Old Telephone Service (POTS).

According to certain embodiments, the network 162 is a telecommunication network. The telecommunication network includes at least one, for example, a computer network (LAN or WAN), internet, internet of things, and a telephone network.

According to certain embodiments, a protocol (for example, transport layer protocol, data link protocol, or physical layer protocol) for communication between the electronic device 101 and the external device is supported by at least one of the application 147, the application programming interface 145, the middleware 143, and the communication interface 170.

A first external electronic device 102 and a second external electronic device 104 respectively is the same type as the electronic device 100 or a different type of device. According to certain embodiments of the present disclosure, the server includes at least one group of servers. According to various embodiments of the present disclosure, the whole or a part of operations executed in the electronic device 100 can be executed in another or a plurality of electronic device (for example, electronic device 102, electronic device 104, or server 106). According to certain embodiments of the present disclosure, when the electronic device is required to execute a function or a service automatically or according to a request, the electronic device may not execute the function or service by itself and additionally request other devices (for example. electronic device 102, electronic device 104, or server 106) for at least a part of related functions. The other devices (for example, electronic device 102, electronic device 104, or server 106) can execute the requested or additional function and transmit the result of execution to the electronic device 100. The electronic device 100 can provide the requested function or service by processing the result as it is or additionally. For this, a cloud computing, distribution computing, or client-server computing technology can be utilized.

Figure 2:
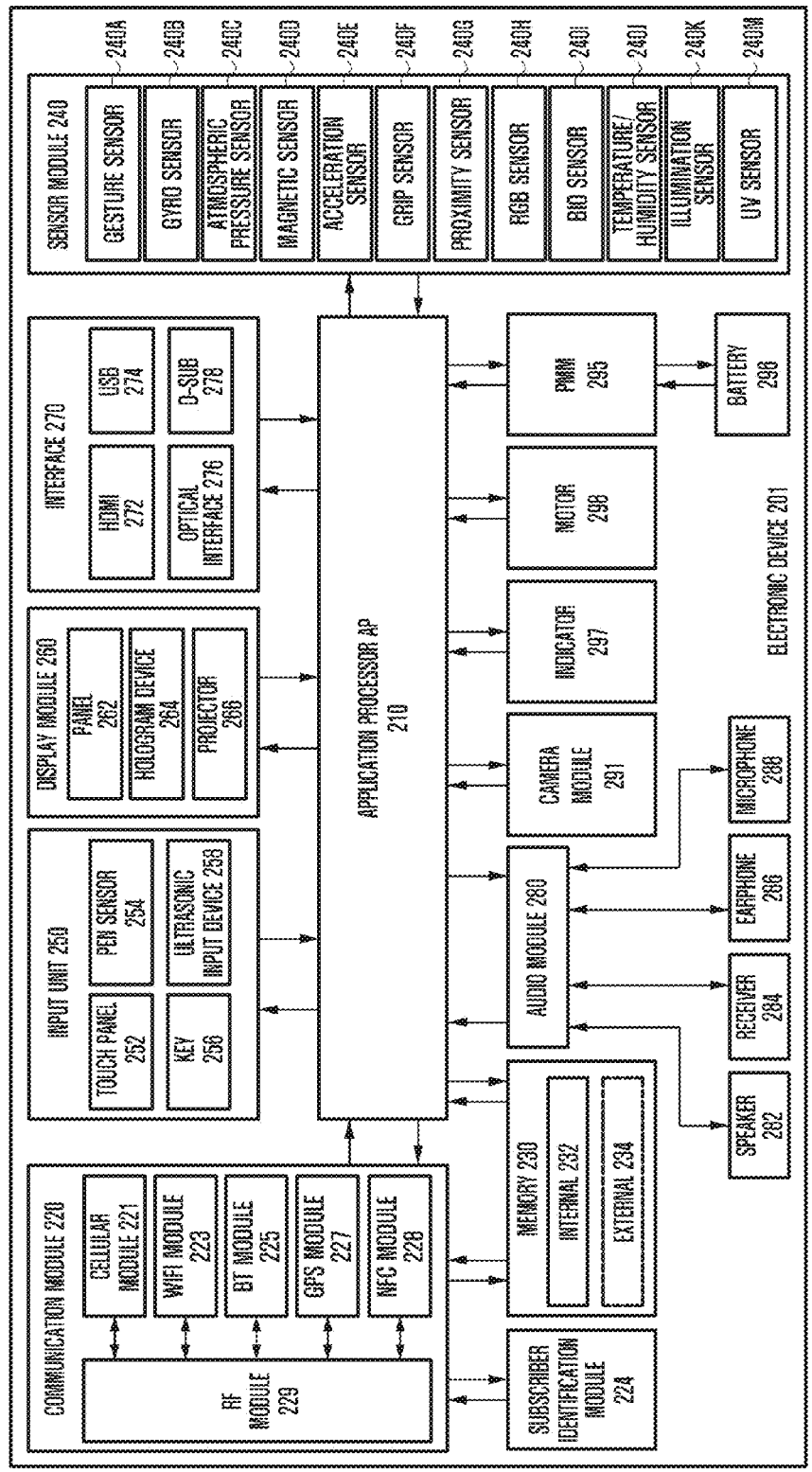
FIG. 2 illustrates an electronic device according to various embodiments of the present disclosure.

FIG. 2 is a block diagram of an electronic device 201 according to various embodiments of the present disclosure.

The electronic device 201 is, for example, the electronic device 100 illustrated in FIG. 1. Referring to FIG. 2, the electronic device 201 includes one or more processors 210, a communication module 220, a Subscriber Identification Module (SIM) card 224, a memory 230, a sensor module 240, a user input unit 250, a display module 260, an interface 270, an audio coder/decoder (codec) module 280, a camera module 291, a power management module 295, a battery 296, an indicator 297, a motor 298 and any other similar and/or suitable components.

The processor 210 (e.g., the processor 120) includes one or more Application Processors (APs), or one or more Communication Processors (CPs). The processor 210 is, for example, the processor 120 illustrated in FIG. 1. The AP and the CP are illustrated as being included in the processor 210 in FIG. 2, but is included in different Integrated Circuit (IC) packages, respectively. According to certain embodiments of the present disclosure, the AP and the CP is included in one IC package.

The AP executes an Operating System (OS) or an application program, and thereby controls multiple hardware or software elements connected to the AP and performs processing of and arithmetic operations on various data including multimedia data. The AP is implemented by, for example, a System on Chip (SoC). According to certain embodiments of the present disclosure, the processor 210 further includes a Graphical Processing Unit (GPU) (not illustrated).

The CP manages a data line and converts a communication protocol in the case of communication between the electronic device (e.g., the electronic device 100) including the electronic device 201 and different electronic devices connected to the electronic device through the network. The CP is implemented by, for example, a SoC. According to certain embodiments of the present disclosure, the CP performs at least some of multimedia control functions. The CP, for example, distinguishes and authenticates a terminal in a communication network by using a subscriber identification module (e.g., the SIM card 224). Also, the CP provides the user with services, such as a voice telephony call, a video telephony call, a text message, packet data, and the like.

Further, the CP controls the transmission and reception of data by the communication module 220. In FIG. 2, the elements such as the CP, the power management module 295, the memory 230, and the like are illustrated as elements separate from the AP. However, according to certain embodiments of the present disclosure, the AP includes at least some (e.g., the CP) of the above-described elements.

According to certain embodiments of the present disclosure, the AP or the CP loads, to a volatile memory, a command or data received from at least one of a non-volatile memory and other elements connected to each of the AP and the CP and processes the loaded command or data. Also, the AP or the CP stores, in a non-volatile memory, data received from or generated by at least one of the other elements.

The SIM card 224 is a card implementing a subscriber identification module, and is inserted into a slot formed in a particular portion of the electronic device 100. The SIM card 224 includes unique identification information (e.g., Integrated Circuit Card IDentifier (ICCID)) or subscriber information (e.g., International Mobile Subscriber Identity (IMSI)).

The memory 230 includes an internal memory 232 and an external memory 234. The memory 230 is, for example, the memory 130 illustrated in FIG. 1. The internal memory 232 includes, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to certain embodiments of the present disclosure, the internal memory 232 is in the form of a Solid State Drive (SSD). The external memory 234 further includes a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 220 includes a wireless communication module or a Radio Frequency (RF) module 229. The communication module 220 is, for example, the communication interface 170 illustrated in FIG. 1. The wireless communication module includes, for example, a cellular module 221, a Wi-Fi part 223, a BT part 225, a GPS part 227, or a NFC part 228. For example, the wireless communication module provides a wireless communication function by using a radio frequency. Additionally or alternatively, the wireless communication module include a network interface (e.g., a LAN card), a modulator/demodulator (modem), or the like for connecting the electronic device 201 to a network (e.g., the Internet, a LAN, a WAN, a telecommunication network, a cellular network, a satellite network, a POTS, or the like).

The RF module 229 is used for transmission and reception of data, for example, transmission and reception of RF signals or called electronic signals. Although not illustrated, the RF unit 229 includes, for example, a transceiver, a Power Amplifier Module (PAM), a frequency filter, a Low Noise Amplifier (LNA), or the like. Also, the RF module 229 further includes a component for transmitting and receiving electromagnetic waves in a free space in a wireless communication, for example, a conductor, a conductive wire, or the like.

The sensor module 240 includes, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240I, an illumination sensor 240K, and a Ultra Violet (UV) sensor 240M. The sensor module 240 measures a physical quantity or senses an operating state of the electronic device 100, and converts the measured or sensed information to an electrical signal. The sensor module 240 includes, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. The sensor module 240 includes, for example, an E-nose sensor (not illustrated), an EMG sensor (not illustrated), an EEG sensor (not illustrated), an ECG sensor (not illustrated), a fingerprint sensor, and the like. The sensor module 240 further includes a control circuit (not illustrated) for controlling one or more sensors included therein.

The user input unit 250 includes a touch panel 252, a pen sensor 254 (e.g., a digital pen sensor), keys 256, and an ultrasonic input device 258. The user input unit 250 is, for example, the user input module 140 illustrated in FIG. 1. The touch panel 252 recognizes a touch input in at least one of, for example, a capacitive scheme, a resistive scheme, an infrared scheme, and an acoustic wave scheme. Also, the touch panel 252 further includes a controller (not illustrated). In the capacitive type, the touch panel 252 is capable of recognizing proximity as well as a direct touch. The touch panel 252 further includes a tactile layer (not illustrated). In this event, the touch panel 252 provides a tactile response to the user.

The pen sensor 254 (e.g., a digital pen sensor), for example, is implemented by using a method identical or similar to a method of receiving a touch input from the user, or by using a separate sheet for recognition. For example, a key pad or a touch key is used as the keys 256. The ultrasonic input device 258 enables the terminal to sense a sound wave by using a microphone (e.g., a microphone 288) of the terminal through a pen generating an ultrasonic signal, and to identify data. The ultrasonic input device 258 is capable of wireless recognition. According to certain embodiments of the present disclosure, the electronic device 201 receives a user input from an external device (e.g., a network, a computer, or a server), which is connected to the communication module 220, through the communication module 220.

The display module 260 includes a panel 262, a hologram device 264 and a projector 266. The display module 260 is, for example, the display module 160 illustrated in FIG. 1. The panel 262 is, for example, a Liquid Crystal Display (LCD) and an Active Matrix Organic Light Emitting Diode (AM-OLED) display, and the like. The panel 262 is implemented so as to be, for example, flexible, transparent, or wearable. The panel 262 includes the touch panel 252 and one module. The hologram device 264 displays a three-dimensional image in the air by using interference of light. The projector 266 projects light on a screen to display an image. For example, the screen is located inside or outside the electronic device 201. According to certain embodiments of the present disclosure, the display module 260 further includes a control circuit for controlling the panel 262, the hologram 264, and the projector 266.

The interface 270 includes, for example, a High-Definition Multimedia Interface (HDMI) 272, a Universal Serial Bus (USB) 274, an optical interface 276, and a D-subminiature (D-sub) 278. Additionally or alternatively, the interface 270 includes, for example, SD/Multi-Media Card (MMC) (not illustrated) or Infrared Data Association (IrDA) (not illustrated).

The audio codec module 280 bidirectionally converts between a voice and an electrical signal. The audio codec module 280 converts voice information, which is input to or output from the audio codec module 280, through, for example, a speaker 282, a receiver 284, an earphone 286, the microphone 288 or the like.

The camera module 291 captures an image and a moving image. According to certain embodiments, the camera module 291 includes one or more image sensors (e.g., a front lens or a back lens), an Image Signal Processor (ISP) (not illustrated), and a flash LED (not illustrated).

The power management module 295 manages power of the electronic device 201. Although not illustrated, the power management module 295 includes, for example, a Power Management Integrated Circuit (PMIC), a charger Integrated Circuit (IC), or a battery fuel gauge.

The PMIC is mounted to, for example, an IC or a SoC semiconductor. Charging methods is classified into a wired charging method and a wireless charging method. The charger IC charges a battery, and prevent an overvoltage or an overcurrent from a charger to the battery. According to certain embodiments of the present disclosure, the charger IC includes a charger IC for at least one of the wired charging method and the wireless charging method. Examples of the wireless charging method include a magnetic resonance method, a magnetic induction method, an electromagnetic method, and the like. Additional circuits (e.g., a coil loop, a resonance circuit, a rectifier, etc.) for wireless charging are added in order to perform the wireless charging. The battery fuel gauge measure, for example, a residual quantity of the battery 296, or a voltage, a current or a temperature during the charging. The battery 296 supply power by generating electricity, and is, for example, a rechargeable battery.

The indicator 297 indicates particular states of the electronic device 201 or a part (e.g., the AP) of the electronic device 201, for example, a booting state, a message state, a charging state and the like. The motor 298 converts an electrical signal into a mechanical vibration. The processor 210 controls the sensor module 240.

Although not illustrated, the electronic device 201 includes a processing unit (e.g., a GPU) for supporting a module TV. The processing unit for supporting a module TV processes media data according to standards such as, for example, Digital Multimedia Broadcasting (DMB), Digital Video Broadcasting (DVB), media flow, and the like. Each of the above-described elements of the electronic device 201 according to certain embodiments of the present disclosure includes one or more components, and the name of the relevant element changes depending on the type of electronic device. The electronic device 201 according to certain embodiments of the present disclosure includes at least one of the above-described elements. Some of the above-described elements may be omitted from the electronic device 201, or the electronic device 201 further includes additional elements. Also, some of the elements of the electronic device 201 according to certain embodiments of the present disclosure are combined into one entity, which perform functions identical to those of the relevant elements before the combination.

The term "module" used in the present disclosure refer to, for example, a unit including one or more combinations of hardware, software, and firmware. The "module" is interchangeable with a term, such as "unit," "logic," "logical block," "component," "circuit," or the like. The "module" is a minimum unit of a component formed as one body or a part thereof. The "module" is a minimum unit for performing one or more functions or a part thereof. The "module" is implemented mechanically or electronically. For example, the "module" according to certain embodiments of the present disclosure includes at least one of an Application-Specific Integrated Circuit (ASIC) chip, a Field-Programmable Gate Array (FPGA), and a programmable-logic device for performing certain operations which have been known or are to be developed in the future.

Figure 3:
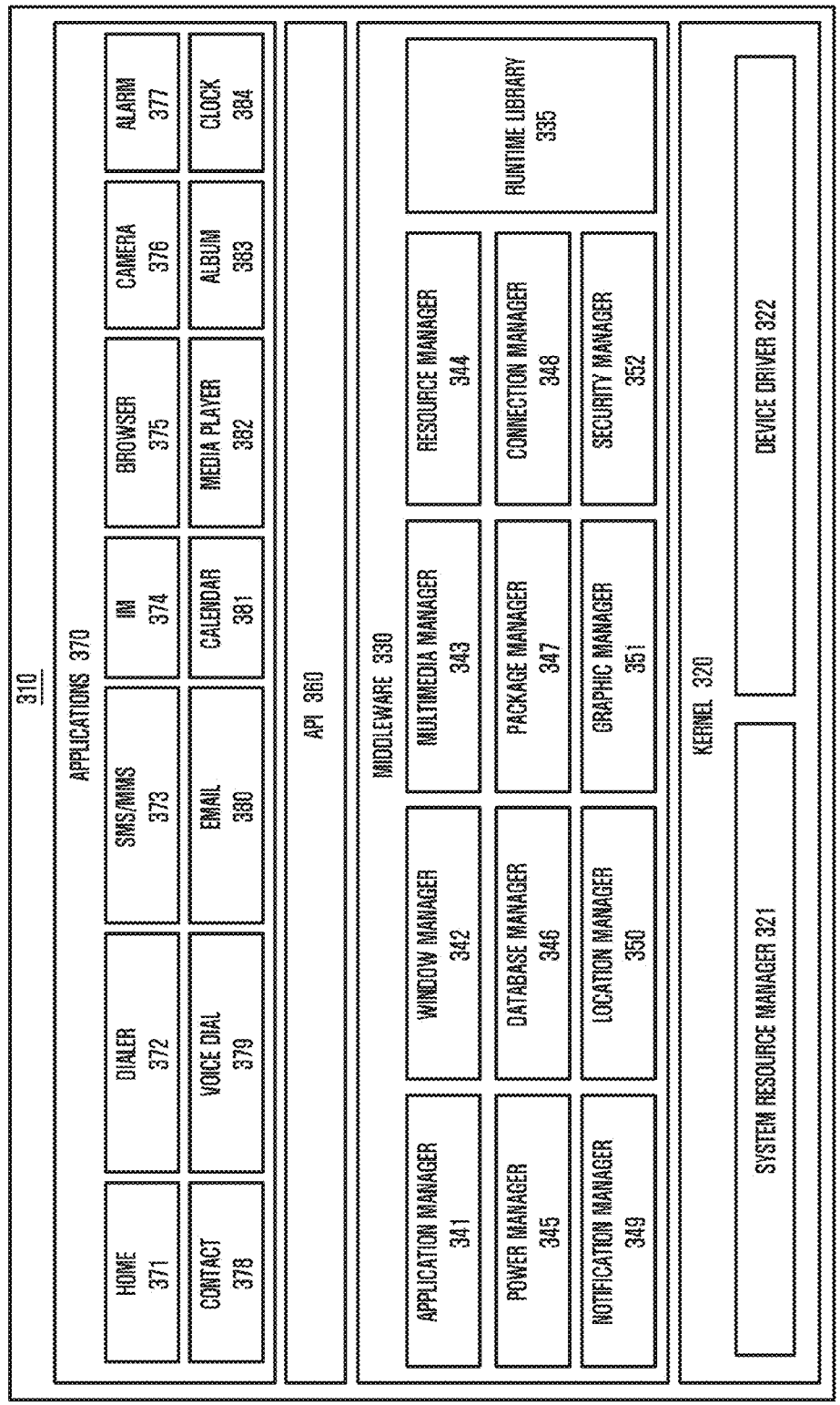
FIG. 3 illustrates a program module according to various embodiments of the present disclosure.

FIG. 3 is a block diagram illustrating a configuration of a programming module 310 according to certain embodiments of the present disclosure.

The programming module 310 is included (or stored) in the electronic device 100 (e.g., the memory 130) illustrated in FIG. 1 or is included (or stored) in the electronic device 201 (e.g., the memory 230) illustrated in FIG. 2. At least a part of the programming module 310 is implemented in software, firmware, hardware, or a combination of two or more thereof. The programming module 310 is implemented in hardware (e.g., the electronic device 210), and includes an OS controlling resources related to an electronic device (e.g., the electronic device 100) and/or various applications (e.g., an application 370) executed in the OS. For example, the OS is ANDROID, iOS, WINDOWS, SYMBIAN, TIZEN, BADA, and the like.

Referring to FIG. 3, the programming module 310 includes a kernel 320, a middleware 330, an API 360, and/or the application 370.

The kernel 320 (e.g., the kernel 141) includes a system resource manager 321 and/or a device driver 322. The system resource manager 321 includes, for example, a process manager (not illustrated), a memory manager (not illustrated), and a file system manager (not illustrated). The system resource manager 321 performs the control, allocation, recovery, and/or the like of system resources. The device driver 322 includes, for example, a display driver (not illustrated), a camera driver (not illustrated), a BLUETOOTH driver (not illustrated), a shared memory driver (not illustrated), a USB driver (not illustrated), a keypad driver (not illustrated), a Wi-Fi driver (not illustrated), and/or an audio driver (not illustrated). Also, according to certain embodiments of the present disclosure, the device driver 322 includes an Inter-Process Communication (IPC) driver (not illustrated).

The middleware 330 includes multiple modules previously implemented so as to provide a function used in common by the applications 370. Also, the middleware 330 provides a function to the applications 370 through the API 360 in order to enable the applications 370 to efficiently use limited system resources within the electronic device. For example, as illustrated in FIG. 3, the middleware 330 (e.g., the middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, a security manager 352, and any other suitable and/or similar manager.

The runtime library 335 includes, for example, a library module used by a complier, in order to add a new function by using a programming language during the execution of the application 370. According to certain embodiments of the present disclosure, the runtime library 335 performs functions that are related to input and output, the management of a memory, an arithmetic function, and/or the like.

The application manager 341 manages, for example, a life cycle of at least one of the applications 370. The window manager 342 manages GUI resources used on the screen. The multimedia manager 343 detects a format used to reproduce various media files and encodes or decodes a media file through a codec appropriate for the relevant format. The resource manager 344 manages resources, such as a source code, a memory, a storage space, and/or the like of at least one of the applications 370.

The power manager 345 operates together with a Basic Input/Output System (BIOS), manages a battery or power, and provides power information and the like used for an operation. The database manager 346 manages a database in such a manner as to enable the generation, search and/or change of the database to be used by at least one of the applications 370. The package manager 347 manages the installation and/or update of an application distributed in the form of a package file.

The connection manager 348 manages a wireless connectivity such as, for example, Wi-Fi and BLUETOOTH. The notification manager 349 displays or reports, to the user, an event such as an arrival message, an appointment, a proximity alarm, and the like in such a manner as not to disturb the user. The location manager 350 manages location information of the electronic device. The graphic manager 351 manages a graphic effect, which is to be provided to the user, and/or a user interface related to the graphic effect. The security manager 352 provides various security functions used for system security, user authentication, and the like. According to certain embodiments of the present disclosure, when the electronic device (e.g., the electronic device 100) has a telephone function, the middleware 330 further includes a telephony manager (not illustrated) for managing a voice telephony call function and/or a video telephony call function of the electronic device.

The middleware 330 generates and uses a new middleware module through various functional combinations of the above-described internal element modules. The middleware 330 provides modules specialized according to types of OSs in order to provide differentiated functions. Also, the middleware 330 dynamically deletes some of the existing elements or adds new elements. Accordingly, the middleware 330 omits some of the elements described in the various embodiments of the present disclosure, further includes other elements, or replaces the some of the elements with elements, each of which performs a similar function and has a different name.

The API 360 (e.g., the API 145) is a set of API programming functions and is provided with a different configuration according to an OS. In the case of ANDROID or iOS, for example, one API set is provided to each platform. In the case of TIZEN, for example, two or more API sets are provided to each platform.

The applications 370 (e.g., the applications 147) includes, for example, a preloaded application and/or a third party application. The applications 370 (e.g., the applications 147) include, for example, a hone application 371, a dialer application 372, a Short Message Service (SMS)/multimedia Service (MMS) application 373, an Instant Message (IM) application 374, a browser application 373, a camera application 376, and alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 is implemented by instructions stored in a non-transitory computer-readable storage medium. When the instructions are executed by one or more processors (e.g., the one or more processors 210), the one or more processors performs functions corresponding to the instructions. The non-transitory computer-readable storage medium is, for example, the memory 230. At least a part of the programming module 310 is implemented (e.g., executed) by, for example, the one or more processors 210. At least a part of the programming module 310 includes, for example, a module, a program, a routine, a set of instructions, and/or a process for performing one or more functions.

Names of the elements of the programming module (e.g., the programming module 310) according to certain embodiments of the present disclosure changes depending on the type of OS. The programming module according to certain embodiments of the present disclosure includes one or more of the above-described elements. Alternatively, some of the above-described elements may be omitted from the programming module. Alternatively, the programming module further includes additional elements. The operations performed by the programming module or other elements according to certain embodiments of the present disclosure are processed in a sequential method, a parallel method, a repetitive method, or a heuristic method. Also, some of the operations may be omitted, or other operations may be added to the operations.

Figure 4:
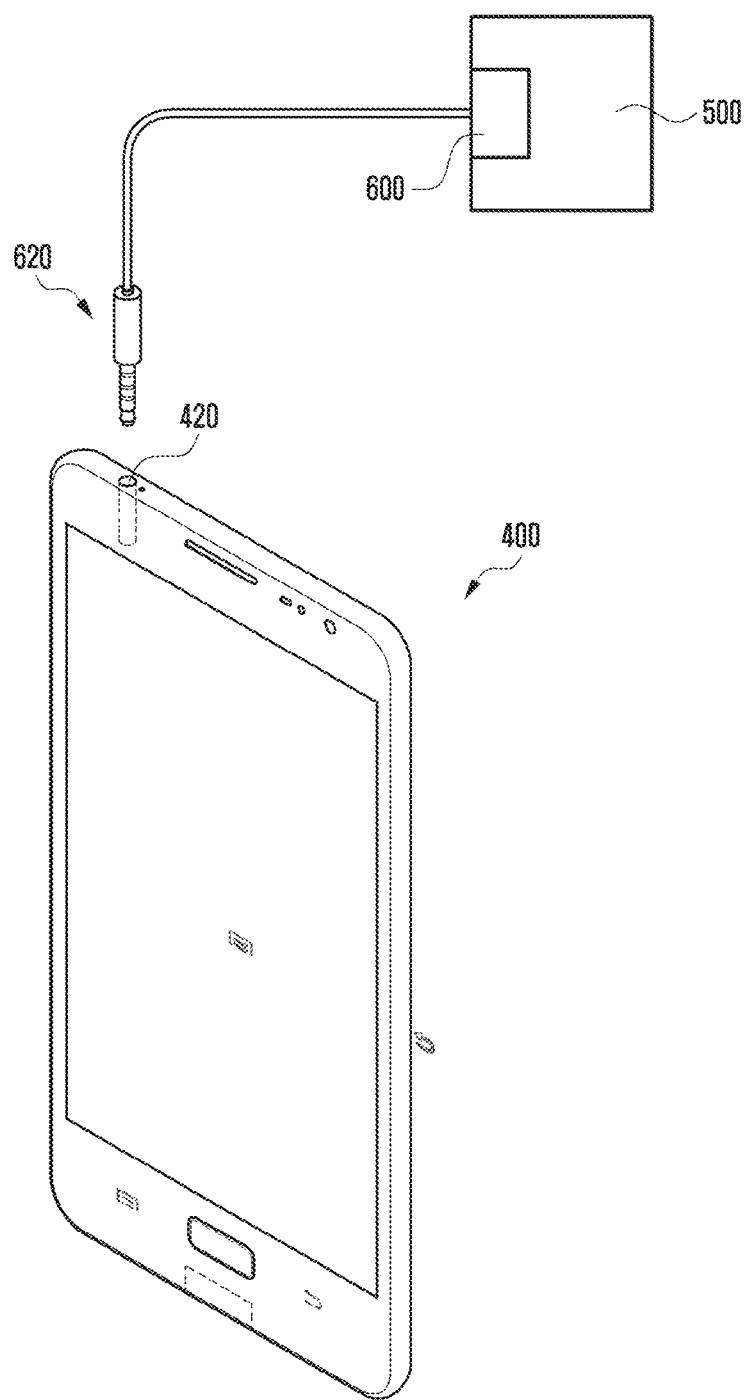
FIG. 4 illustrates a configuration of an interface device that interconnects an electronic device and an external device using an ear jack of the electronic device according to various embodiments of the present disclosure.

FIG. 4 illustrates a configuration in which an electronic device of a data communication device, according to various embodiments of the present disclosure, is connected with an external device using an ear jack.

As illustrated in FIG. 4, an interface device, according to various embodiments of the present disclosure, uses an ear jack 420 of an electronic device 400 as a means for data communication by a data communication method through the ear jack 420 of the electronic device 400 without limiting the use of the ear jack 420 to simple input/output of sounds.

According to various embodiments of the present disclosure, the interface device includes an interface unit 600 that interconnects the electronic device 400, such as a smart phone, and an external device 500, such as a blood glucose meter such that data communication is enabled between the electronic device 400 and the external device 500.

According to certain embodiments, the electronic device 400 is a smart phone, and is provided with an ear jack 420.

The external device 500 is provided with an interface unit 600 having a connector unit 620 that is inserted into the ear jack 420.

When the connector unit 620 of the interface unit 600 is inserted into the ear jack 420 of the electronic device 400, the electronic device 400 and the external device 500 are interconnected such that data communication is enabled therebetween.

According to certain embodiments, a signal to be exchanged between the ear jack 420 and the connector unit 620 is an analogue signal, and a signal to be exchanged between the connector unit 620 and the interface unit 600 is a digital signal. That is, in a data communication mode where the electronic device 400 executes data communication with the external device 500, a signal to be output through the ear jack 420 is a signal containing digital data while assuming a format of an analog signal.

For example, a smart phone serving as the electronic device 400 includes an audio codec therein that converts an audio signal input through the ear jack 420 into a digital format or converts an audio signal output through the ear jack 420 into an analog format. That is, the audio codec in the electronic device 400 refers to a device that allows a digital music file to be heard as an analog sound, such as an MP3, and has a function of receiving Pulse Code Modulation (PCM) data from a control unit and converting the PCM data into an analog signal. Through this, the audio codec generates, using a method of generating PCM data like an analog serial signal, a waveform in the form of a serial signal form that is generated by a Universal Asynchronous Receiver/Transmitter (UART). In addition, the audio codec also recognizes an audio signal that is input/output according to a set reference level voltage.

Typically, the ear jack 420 of the electronic device 400 and the external device 500 have different input/output signal levels, and data communication is disabled therebetween when they are directly connected to each other. The interface unit 600 performs a function of enabling the data communication by converting a signal received through the ear jack 420 into a signal level that is recognizable by the audio codec of the electronic device 400 and converting a signal output through the ear jack 420 into a signal level that is recognizable by the external device 500.

Accordingly, when a user wishes to listen to music using, for example, the electronic device 400, the user connects an earphone to the ear jack 420 of the electronic device 400. On the contrary, when data communication with the external device 500 is required, the user inserts the connector unit 620 of the interface unit 600 into the ear jack 420 so as to connect the electronic device 400 to the external device 500.

Meanwhile, although FIG. 4 illustrates that interface unit 600 is integrally provided in the external device 500, the interface unit 600 is manufactured as a repeater device that is separate from the external device 500. In this case, the interface unit 600 includes a pair of first and second connector units, in which the first connector unit is connected with the electronic device 400 through the ear jack 420, and the second connector unit is connected with a control unit within the external device 500.

While a smart phone is exemplified as the electronic device 400 that becomes an object to receive digital data output from the external device 500, any electronic device 400 is applicable as long as the electronic device 400 is provided with the ear jack 420.

Figure 5:
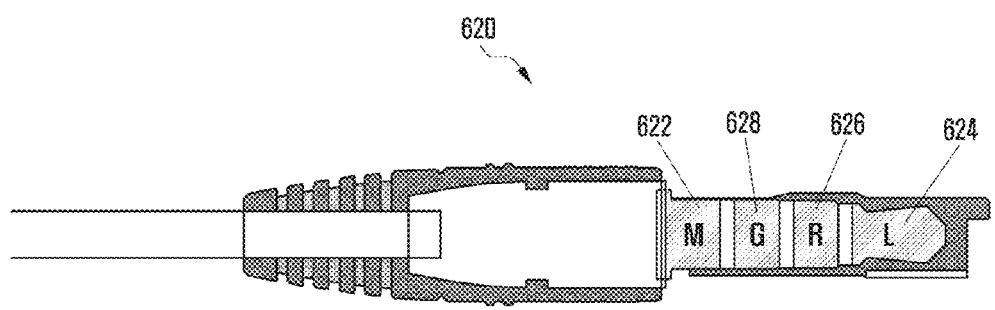
FIG. 5 illustrates a connector unit of the interface unit of FIG. 4 in detail according to various embodiments of the present disclosure.
Figure 6:
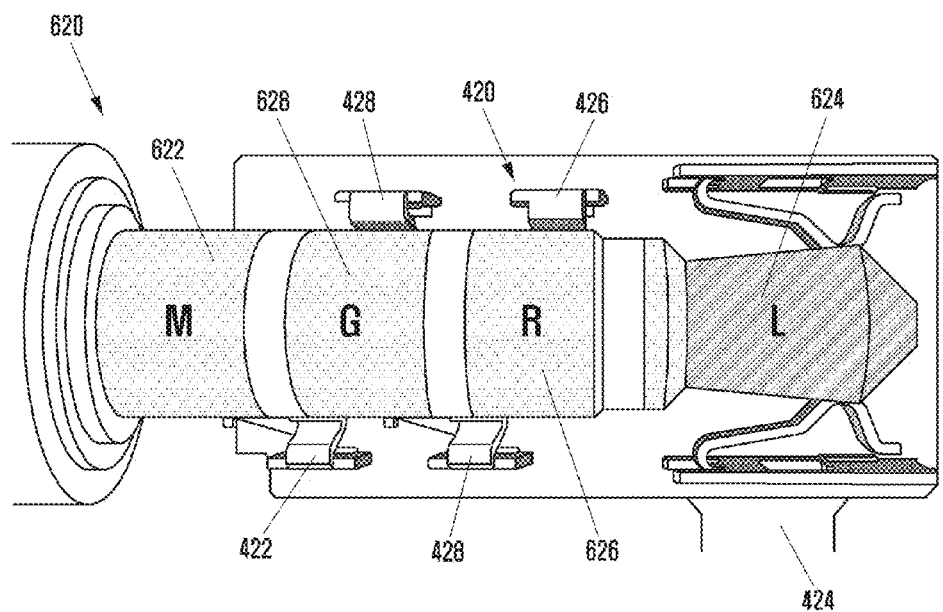
FIG. 6 illustrates the connector unit of the interface unit of FIG. 5 in the state where the connector unit is inserted into and joined to the ear jack of the electronic device according to various embodiments of the present disclosure.

FIG. 5 illustrates the connector unit of the interface unit of FIG. 4 in detail, and FIG. 6 illustrates a state in which the connector unit of FIG. 5 is inserted into and joined to the ear jack of the electronic device.

As illustrated in FIGS. 5 and 6, according to various embodiments of the present disclosure, the ear jack 420 of the electronic device 400 of the interface device is an ear mic port, includes a four-pole terminal such that an external device, such as an earphone, is inserted to detect a connection between the electronic device 400 and the external device 500. That is, in order to input/output an audio signal, the ear jack 420 includes a plurality of terminals, such as a mic (M) 422 that receives an input audio signal, left and right speaker terminals (L, R) 424 and 426 that output an audio signal, and a ground terminal (G) 428.

According to one embodiment, there are a G-detection type and an L-detection type for detecting the connection between the electronic device 400 and the external device 500.

The G-detection type includes a position D of a detecting pin that is positioned at the center thereof so that, for example, the earphone is inserted into the ear jack 420, and the insertion of the earphone is detected as a mic bias is turned ON. But a short may be caused and then a pop-noise is generated due to an unstable operation by a non-standard design.

On the contrary, the L-detection type has a detection pin that is positioned in the inside thereof, and detects the insertion of the earphone as the mic bias is turned ON when the earphone is inserted into the ear jack 420. The L-detection type operates stably due to a standard design.

Unlike this, as illustrated in FIG. 6, the G-detection type and the L-detection type are simultaneously used. In this case, in an earphone embodiment, compatibility with the hardware of the smart phone is maintained.

In addition, according to various embodiments of the present disclosure, the external device 500 of the interface device is joined and connected to correspond to the audio signal input and output terminals of the ear jack 420 provided in the electronic device 400. For this purpose, when the audio signal input and output terminals of the ear jack 420, which are provided in the electronic device 400, are provided in the order of L, R, M, and G according to one embodiment, the connector unit 620 of the interface unit 600, which is integrally provided in the external device 500, includes the plurality of terminals in the order of the left and right speaker terminals (L, R) 624 and 626, the mic terminal (M) 622, and the ground terminal (G) 628 to correspond to the audio signal input and output terminals of the ear jack 420, respectively.

According to various embodiments of the present disclosure, the connector unit 620 of the interface unit 600 is configured in the form of a 3.5 pi ($\varphi$) ear mic jack that is configured in the order of L, R, M, and G like a pair of left and right speaker terminals 624 and 626, the ground terminal 628, and the mic terminal 622 according to the positions of the audio signal input and output terminals of the ear jack 420. Unlike this, the connector unit 620 is configured in the form of a 2.5 pi ($\varphi$) ear mic jack that is configured in the order of L, R, G, and M like a pair of left and right speaker terminals 624 and 626, the ground terminal 628, and the mic terminal 622.

Meanwhile, according to various embodiments of the present disclosure, the connector unit 620 of the interface unit 600 of the interface device includes a recognizing unit that automatically recognizes whether an earphone is connected to the ear jack 420 of the electronic device 400 or whether an appcessory is connected through a plurality of detections.

When a first detection is recognized according to the insertion of an earphone or the connector unit 620 of the interface unit 600 into the ear jack 420 of the electronic device 400, and then a second detection is recognized, the recognizing unit determines that a normal earphone is inserted. When only the second detection is recognized without the recognition of the first detection, the recognizing unit recognizes it as an exceptional case and determines that an appcessory of the external device 500, i.e. an external appcessory, is inserted.

Based on the automatic recognition of the recognizing unit as described above, in the case where the earphone insertion is recognized, an operation as an interface of the existing earphone is performed, and in the case when the appcessory insertion is recognized, data communication is performed as, for example, inputting through the mic, and outputting through the left speaker as if the existing appcessory operates.

In addition, an ID is acquired through data communication from the appcessory as the external device 500 to execute the corresponding application. According to certain embodiments, an ID to be recognized by the electronic device 400 is made by differentiating a separate impedance within the appcessory of the external device 500. When an appcessory ID is implemented in this way, the electronic device 400 recognizes the corresponding ID, and then automatically executes an associated app. When there are a plurality of associated apps, the electronic device 400 displays a list to be shown on the user interface so that the user selects the corresponding ID.

According to various embodiments of the present disclosure, the first detection of the connector unit 620 is fabricated by forming an insulation coating on the L terminal 624 or forming the L terminal 624 using a non-conductive material. According to certain embodiments, the insulation coating is formed as a sapphire coating, a quartz coating, or a Diamond-like Carbon (DLC) coating. In view of the characteristics of a three-pole or four-pole connector unit, the "L" terminal portion wears down, and thus the DLC coating is most suitable.

Advantages and disadvantages of insulation coating methods are summarized in Table 1 below.

TABLE 1

| Coating Material | Hardness | Anti-fingerprint | Easy Cleaning | Transmissivity | Note |
|---|---|---|---|---|---|
| Sapphire | ○ | Δ | ○ | ○ | Hardness may be reinforced to that of Gorilla Glass (6.4 Gpa) |
| Quartz | Δ | ◉ | Δ | ○ | Anti-fingerprint coating |
| DLC | ◉ | ○ | ◉ | X | High hardness Low friction coefficient: 0.1-0.2 (solid lubricant coating) Poor visible ray transmissivity |

◉: Very Good,
○: Good,
Δ: Middle,
X: Poor

Figure 7:
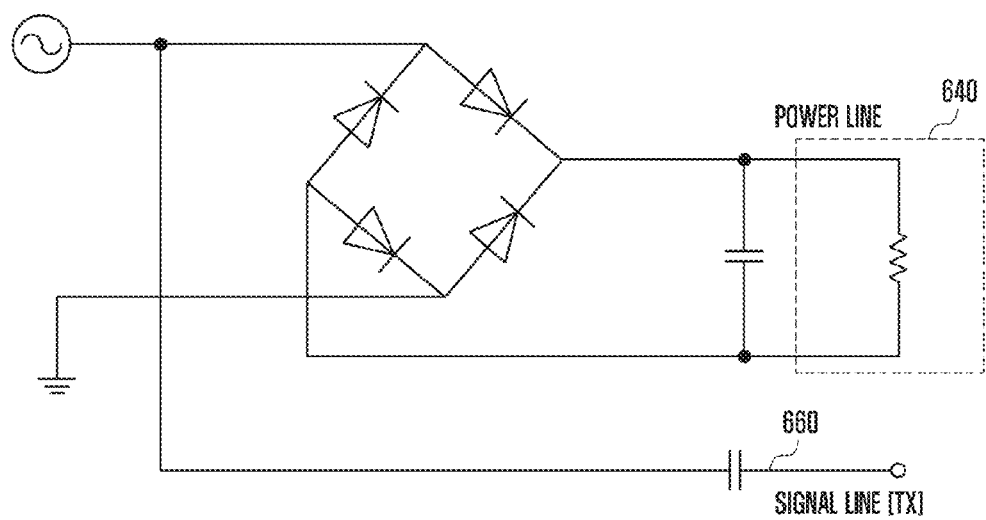
FIG. 7 illustrates a rectifier circuit within an appcessary as an external device according to various embodiments of the present disclosure.
Figure 8:
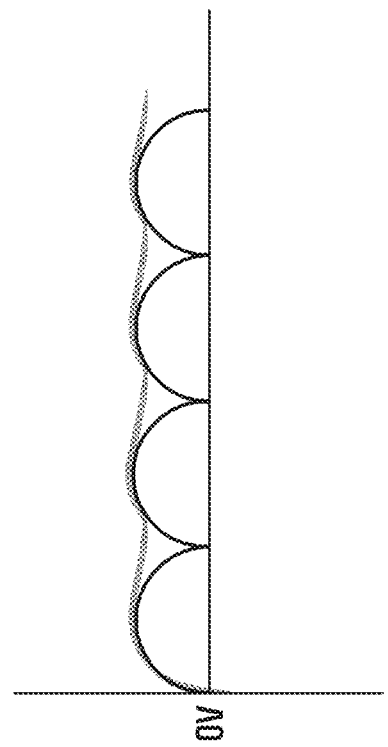
FIG. 8 illustrates diagrams of input and output waveforms transmitted through a power line of the rectifier circuit of FIG. 7 according to various embodiments of the present disclosure.
Figure 8:
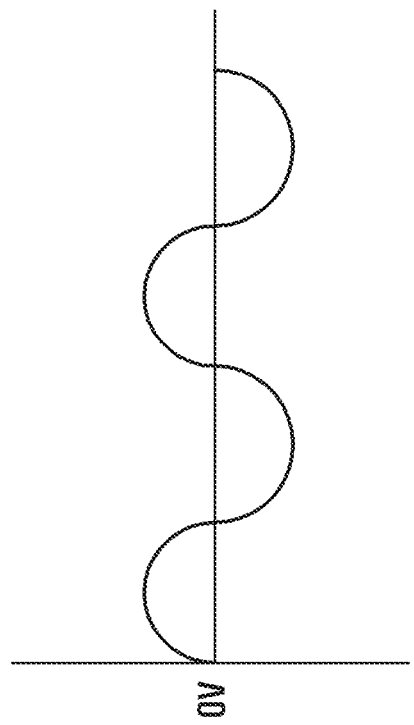

FIG. 7 is a diagram illustrating a rectifier circuit within an appcessory as an external device, and FIG. 8 illustrates diagrams of input and output waveforms that are transmitted through a power line of the rectifier circuit of FIG. 7.

According to various embodiments of the present disclosure, the interface device requires high power in order to execute bi-directional communication between the electronic device 400 and the external device 500. In this case, the appcessory of the external device 500 requires a rectifier circuit (bridge rectifier) as illustrated in FIG. 7 and transmits power through a power line 640 in the rectifier circuit.

In addition, signals, such as Amplitude Shift Keying (ASK), Phase Shift Keying (PSK), and Frequency Shift Keying (FSK) signals, are transmitted through a signal line 660 of the rectifier circuit of FIG. 7 so as to perform data communication.

According to certain embodiments, a switch, which is switchable to a higher voltage, is added to the mic bias circuit of the electronic device 400, and in the case where a high bias voltage is required for using an appcessory of the external device 500, the appcessory of the external device 500 is used by switching the switch to the high bias voltage to supply higher power to the appcessory of the external device 500.

Figure 9:
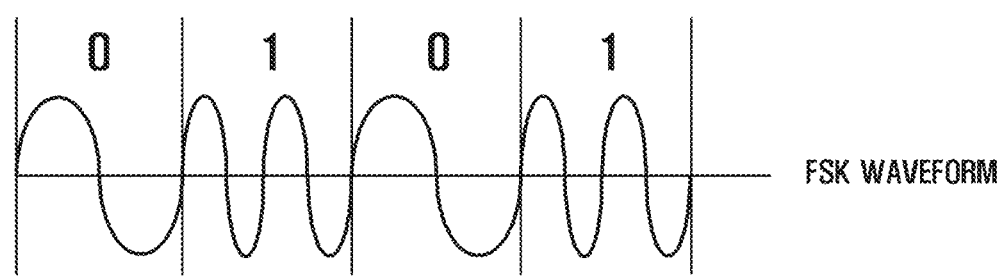
FIG. 9 illustrates a diagram of an FSK waveform transmitted through a signal line of the rectifier circuit of FIG. 7 according to various embodiments of the present disclosure.

FIG. 9 is a diagram illustrating a Frequency-Shift Keying (FSK) waveform that is transmitted through the signal line of the rectifier circuit of FIG. 7.

The FSK is a form of a Frequency Modulation (FM) in a broad sense and is used when a digital signal is transmitted through an analog transmission path. The FSK is a modulation method that shifts a digital signal to different signals according to input digital symbols, and a frequency modulation system in which digital information is transmitted through a discrete frequency variation of a carrier wave.

The simplest FSK is a binary FSK, i.e., a BFSK that uses a pair of discrete frequencies in order to transmit binary information (composed of 0 and 1), in which 1 and 0 correspond to two high and low frequencies, respectively, between which a central frequency is interleaved. In that event, "1" is referred to as a mark frequency, and "0" is referred to as a space frequency. That is, two frequencies of f1 and f0 are assigned to 1 and 0, respectively.

By using two states of high and low frequencies as described above, the FSK is robust against noise but is not suitable for high speed transmission. The FSK is used in a low speed line model of 200 to 1,200 bps. FSK modem standards include CCITT (now ITU-T) Recommendation V.21, V.23, etc. that are used for modulating a control signal in most cellular mobile phone systems including Advanced Mobile Phone System (AMPS).

Unlike the foregoing, when low power is required for executing bi-directional communication between the electronic device 400 and the external device 500, the interface device, according to various embodiments of the present disclosure, performs power supply and data communication using a mic bias voltage (1.8V~) of the electronic device 400.

Meanwhile, in the case where unidirectional communication is only required between the electronic device 400 and the external device 500, a three-pole ear jack is also available.

Figure 10:
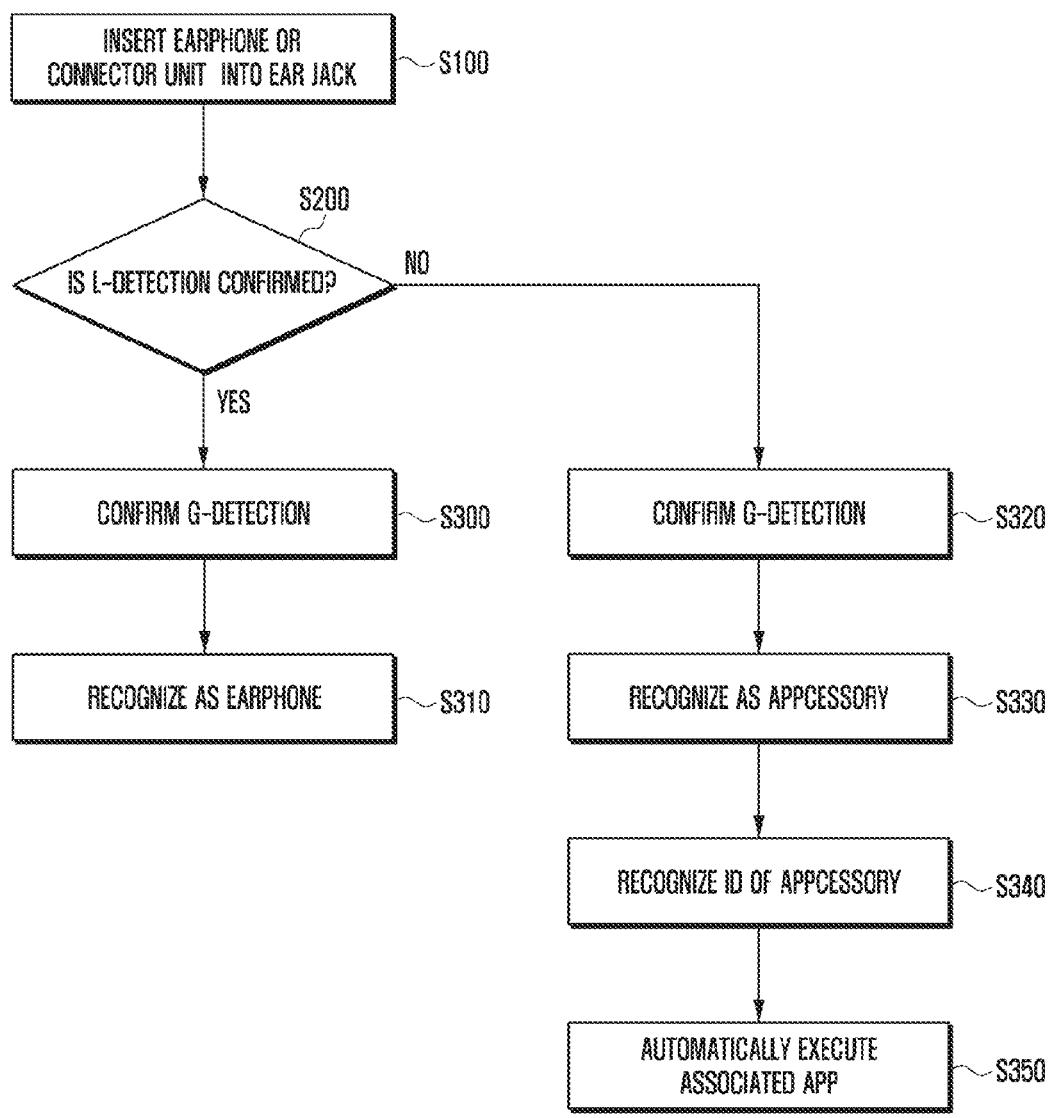
FIG. 10 illustrates a configuration of an interface method between an electronic device and an external device using an ear jack of an electronic device, according to various embodiments of the present disclosure.

An interface method according to various embodiments of the present disclosure will be described below with reference to FIG. 10.

When an earphone, the connector unit 620 of the external device 500, or the like is inserted through the ear jack 420 of the electronic device 400, in operation S100, it is confirmed whether the first detection, i.e. L-detection exists, in operation S200.

Subsequent to the confirmation of the L-detection, it is confirmed whether G-detection exists, in operation S300. When the G-detection is confirmed, it is recognized that an earphone is connected, in operation S310.

When the G-detection is confirmed in the state where the L-detection has not been confirmed in operation S200, in operation S320, it is recognized that an appcessory of the external device 500 is connected, in operation S330.

Subsequently, after recognizing the ID of the appcessory in operation S340, an associated application is automatically executed, in operation S350.

As described above, when the first detection is confirmed and then the second detection is confirmed, the interface method, according to various embodiments of the present disclosure, determines that it is recognized that a normal earphone is connected.

In addition, when only the second detection is recognized in the state where the first detection is not recognized, the interface method determines that it is recognized that an appcessory of the external device 500 is connected as a separate exceptional case.

Based on such determinations, when the earphone connection is recognized, the earphone operates as if the existing interface operates, and when the appcessory connection is recognized rather than the earphone connection, data communication is performed by inputting through M (mic) terminal, outputting through the R (right) speaker terminal, etc. as if the existing appcessory operates.

An ID is acquired from the appcessory through the data communication and then the corresponding application of the ID is executed.

In operation S330, in the case where the appcessory connection is recognized, in the interface device, according to various embodiments of the present disclosure, when a battery is embedded in the appcessory of the external device 500 at the time of bi-directional communication, the earphone and the appcessory operate as indicated in Table 2 below.

TABLE 2

| Terminal | Earphone | Appcessory |
|---|---|---|
| L | Left output | N/A |
| R | Right output | Data output |
| G | Ground | Ground |
| M | Mic input | Data input |

Unlike the foregoing, when a battery is not embedded in the appcessory of the external device 500, the earphone and the appcessory operate as indicated in Table 3 below.

TABLE 3

| Terminal | Earphone | Appcessory |
|---|---|---|
| L | Left output | N/A |
| R | Right output | Data output + Power (rectification − high power) |
| G | Ground | Ground |
| M | Mic input | Data input + power (bias − low power) |

As described above, an interface device and interface method between an external device and an electronic device using an ear jack, according to certain embodiments of the present disclosure, can implement an interface that is capable of automatically recognizing an ear jack insertion type appcessory, and can improve the use convenience by automatically executing a corresponding application in a terminal.

In addition, when the appcessory is connected to the ear jack, transceiver silence does not occur in relation to a call even if a separate setting is not manually changed, which prevents the confusion of a user. In addition, the interface of an ear jack connection type appcessory, which can be used while maintaining compatibility between the ear jack interface and hardware (H/W) and software (S/W), is implemented, which can vitalize an ear jack connection type appcessory system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An interface device comprising:
an electronic device including an ear jack and a processor, the ear jack comprising a plurality of audio signal input and output terminals and the processor recognizing whether an external device is connected to the ear jack through a plurality of detections; and
an external device including an interface unit comprising a connector unit configured to be inserted into the ear jack, the connector unit comprising a plurality of terminals that correspond respectively to each of the plurality of audio signal input and output terminals in the ear jack of the electronic device,
wherein recognizing whether the external device is connected to the ear jack comprises:
determining, if a first detection is recognized and then a second detection is recognized, the external device as an audio output device; and
determining, if the second detection is recognized without recognition of the first detection, the external device as a data communication device,
wherein the terminal in the first detection is a left speaker terminal (L), and the terminal in the second detection is a ground terminal (G).

2. The interface device of claim 1, wherein the first detection comprises an L-detection for detecting whether a left speaker terminal (L) of the connector unit is not electrically connected.

3. The interface device of claim 1, wherein among the plurality of terminals of the connector unit, any one terminal is formed with an insulation coating or is made of a non-conductive material such that the terminal is not electrically connected.

4. The interface device of claim 3, wherein the insulation coating is selected from a group including a sapphire coating, a quartz coating, and a diamond-like carbon (DLC) coating.

5. The interface device of claim 1, wherein the first detection indicates that any one of the plurality of audio signal input and output terminals in the ear jack of the electronic device and any one corresponding a terminal of the connector unit of the interface unit are connected with each other, and wherein
the second detection indicates that another one of the plurality of audio signal input and output terminals provided in the ear jack of the electronic device and another corresponding terminal of the connector unit of the interface unit are connected with each other.

6. The interface device of claim 1, wherein an identification (ID), recognizable by the electronic device by differentiating an impedance within the data communication device, is acquired through a data communication so that an associated application is automatically executed.

7. The interface device of claim 6, wherein, when the ID is implemented, the processor is configured to recognize a corresponding ID, and when there are a plurality of associated applications, the processor is configured to display an associated application list on a user interface so that a user selects any one of the associated applications.

8. The interface device of claim 1, further comprising:
a rectifier circuit (bridge rectifier) configured to transmit power to the data communication device through a power line and transmit at least one of amplitude shift keying (ASK), phase shift keying (PSK), and frequency shift keying (FSK) signals through a signal line, in a case where high power is required in order to execute bi-directional communication between the electronic device and the external device.

9. The interface device of claim 1, further comprising a switch that is switchable to a higher voltage in a mic bias circuit of the electronic device.

10. The interface device of claim 1, wherein, in a case where low power is required in order to execute bi-directional communication between the electronic device and the external device, a mic bias voltage (1.8V~) of the electronic device is used.

11. The interface device of claim 1, wherein a three-pole ear jack is used for a unidirectional communication between the electronic device and the data communication device.

12. An interface method comprising:
inserting a connector unit of an external device through an ear jack of an electronic device;
confirming, by a processor of the electronic device, whether a first detection exists;
confirming, by the processor of the electronic device, whether a second detection exists subsequent to the confirming of the first detection;
determining, by the processor of the electronic device, if the first detection and the second detection are both recognized, the external device as an audio output device; and
determining, by the processor of the electronic device, if the second detection is recognized without recognition of the first detection, the external device as a data communication device,
wherein a terminal in the first detection is a left speaker terminal (L), and the terminal in the second detection is a ground terminal (G).

13. The interface method of claim 12, further comprising recognizing an identification (ID) of the data communication device in response to determining the connected external device as the data communication device.

14. The interface method of claim 12, wherein the first detection indicates that any one of a plurality of audio signal input and output terminals provided in the ear jack of the electronic device and any one corresponding terminal of the connector unit of an interface unit are connected with each other, and wherein
the second detection indicates that another one of the plurality of audio signal input and output terminals provided in the ear jack of the electronic device and another corresponding terminal of the connector unit of the interface unit are connected with each other.

15. The interface method of claim 14, wherein a first detection terminal of the connector unit is formed with an insulation coating or is made of a non-conductive material such that the first detection terminal is not electrically connected.

16. The interface method of claim 15, wherein the insulation coating is selected from a group including a sapphire coating, a quartz coating, and a diamond-like carbon (DLC) coating.

17. The interface method of claim 12, further comprising transmitting power to an appcessory of the external device through a power line and transmit amplitude shift keying (ASK), phase shift keying (PSK), and frequency shift keying (FSK) signals through a signal line, in a case where high power is required in order to execute bi-directional communication between the electronic device and the external device.

18. The interface method of claim 12, further comprising, where low power is required in order to execute bi-directional communication between the electronic device and the external device, using a mic bias voltage (1.8V~) of the electronic device.

* * * * *